United States Patent
Lee et al.

(10) Patent No.: US 11,687,426 B1
(45) Date of Patent: Jun. 27, 2023

(54) TECHNIQUES FOR MANAGING FAILED STORAGE DEVICES

(71) Applicant: Dell Products L.P., Round Rock, TX (US)

(72) Inventors: Shuyu Lee, Acton, MA (US); Ronald Proulx, Boxborough, MA (US); Wayne Garrett, Jr., Bellingham, MA (US); Gerry Fredette, Bellingham, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/732,022

(22) Filed: Apr. 28, 2022

(51) Int. Cl.
*G06F 11/20* (2006.01)
*G06F 11/07* (2006.01)
*G06F 11/10* (2006.01)

(52) U.S. Cl.
CPC ........ *G06F 11/2094* (2013.01); *G06F 11/076* (2013.01); *G06F 11/0772* (2013.01); *G06F 11/1088* (2013.01)

(58) Field of Classification Search
CPC .............. G06F 11/076; G06F 11/0772; G06F 11/1088; G06F 11/2094
USPC ........................................ 714/6.12, 6.2, 6.32
See application file for complete search history.

(56) References Cited

U.S. PATENT DOCUMENTS

| | | | |
|---|---|---|---|
| 8,825,938 B1* | 9/2014 | Ellard ................. | G06F 12/0246 711/E12.008 |
| 2004/0153730 A1* | 8/2004 | Tanaka ................ | G06F 11/1084 714/E11.034 |
| 2006/0149999 A1* | 7/2006 | Hung ................... | G06F 11/1084 714/6.32 |
| 2016/0019114 A1* | 1/2016 | Han ..................... | G06F 11/1076 714/764 |
| 2017/0123915 A1* | 5/2017 | Nguyen ................ | G06F 3/0619 |

* cited by examiner

*Primary Examiner* — Chae M Ko
(74) *Attorney, Agent, or Firm* — Krishnendu Gupta; Deepika Bhayana; Derek Lam

(57) ABSTRACT

Techniques described herein manage failed storage devices. A number of failed storage devices is determined to exceed a number of redundancies in a storage configuration of the storage system. The status of a failed storage device is changed to permit solely read operations. Valid data from the failed storage device is copied to a spare storage device. Invalid data on the failed storage device is reconstructed based on corresponding data from other storage devices, and the reconstructed data is stored on the spare storage device. The failed storage device is removed from the storage system.

20 Claims, 6 Drawing Sheets

| Storage device 17 | | | | | |
|---|---|---|---|---|---|
| Die 205a | Die 205b | Die 205c | Die 205d | Die 205e | Die 205n |
| ⋮ | ⋮ | ⋮ | ⋮ | ⋮ | |
| ⋮ | ⋮ | ⋮ | ⋮ | ⋮ | |
| ⋮ | ⋮ | ⋮ | ⋮ | ⋮ | |
| ⋮ | ⋮ | ⋮ | ⋮ | ⋮ | |

FIG. 2

| Die 205 | | | | | |
|---|---|---|---|---|---|
| LBA 305a | LBA 305b | LBA 305c | LBA 305d | LBA 305e | |
| ⋮ | ⋮ | ⋮ | ⋮ | ⋮ | |
| ⋮ | ⋮ | ⋮ | ⋮ | ⋮ | |
| ⋮ | ⋮ | ⋮ | ⋮ | ⋮ | |
| ⋮ | ⋮ | ⋮ | ⋮ | LBA 305n | |

FIG. 3

| Drive | D1 17a | D2 17b | D3 17c | D4 17d | D5 17e | Spare 1 17f | Spare 2 17g |
|---|---|---|---|---|---|---|---|
| Die 205a | $1^1$ | $2^1$ | $3^1$ | $4^1$ | $5^1$ | $S1^1 = 2^1 \wedge 3^1 \wedge 4^1 \wedge 5^1$ | $S2^2 = 2^1$ |
| Die 205b | $1^2$ | $2^2$ | $3^2$ | $4^2$ | $5^2$ | $S1^2 = 1^2$ | $S2^2 = 2^2$ |
| Die 205c | $1^3$ | $2^3$ | $3^3$ | $4^3$ | $5^3$ | $S1^3 = 1^3$ | $S2^3 = 1^3 \wedge 3^3 \wedge 4^3 \wedge 5^3$ |
| Die 205d | $1^4$ | $2^4$ | $3^4$ | $4^4$ | $5^4$ | $S1^4 = 1^4$ | $S1^4 = 2^4$ |

TECHNIQUES FOR MANAGING FAILED STORAGE DEVICES

BACKGROUND

Technical Field

This application relates to managing failed storage devices in a storage system.

Description of Related Art

A distributed storage system may include a plurality of storage devices to provide data storage to a plurality of hosts. The plurality of storage devices and the plurality of hosts may be situated in the same physical location, or in one or more physically remote locations. The storage devices and the hosts may be connected to one another over one or more computer networks.

The storage devices may be organized to provide redundancy to the stored data. Exemplary configurations include 4+1 RAID, 8+1, and 16+1 RAID, though other configurations may be used. As data is written to and/or read from devices in the storage system, the operations cause wear on the physical devices. Thus, over time, the devices become sufficient worn so as to fail, rendering the data invalid and unreliable.

SUMMARY OF THE INVENTION

One aspect of the current technique is a method for managing failed storage devices in a storage system. The method includes determining that a number of failed storage devices exceeds a number of redundancies in a storage configuration of the storage system. The method includes changing a status of a failed storage device to permit solely read operations. The method includes copying valid data from the failed storage device to a spare storage device. The method includes reconstructing invalid data on the failed storage device based on corresponding data from other storage devices. The method includes storing the reconstructed data on the spare storage device. The method includes removing the failed storage device from the storage system.

The failed storage device in the storage system may be replaced with the spare storage device. The number of failed storage devices may be compared to the number of redundancies in the storage configuration. The status of the failed storage device may be changed so as to permit read operations solely from logical addresses storing valid data. Data from logical addresses storing valid data may be copied to the spare storage device. Corresponding data stored on the other storage devices may be determined to be valid. For each of the other storage devices, a status of the storage device regarding the validity of its stored data may be determined, and for one of these devices, at least some of its stored data may be invalid. Nevertheless, it may still be determined that for that same device, data corresponding to invalid data on the failed storage device remains valid on that additional device. Data corresponding to the data that is invalid on the failed storage device may be read from each of the other storage devices and used to reconstruct the data.

Another aspect of the current technique is a system, with a processor, for managing failed storage devices in a storage system. The processor may be configured to perform any process in conformance with the aspect of the current techniques described above.

Another aspect of the current technique is a non-transitory computer readable medium with code stored thereon. When executed, the code may perform any process in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which:

FIG. 2 is a block diagram depicting a set of dies on an exemplary storage device in the computer system of FIG. 1;

FIG. 3 is a block diagram depicting logical block addresses spanned by an exemplary storage device in the computer system of FIG. 1;

FIG. 4 is a table illustrating an example of the techniques described herein, as applied to a 4+1 RAID storage system with two spare storage devices.

DETAILED DESCRIPTION OF EMBODIMENT(S)

Figure 1:
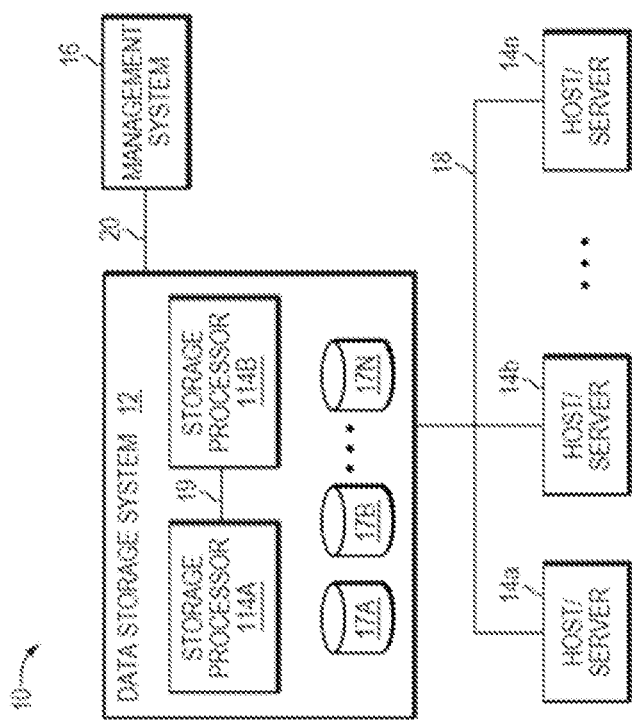
FIG. 1 depicts an example embodiment of a computer system that may be used in connection with performing the techniques described herein.

Described below are techniques for managing failed storage devices. The techniques include determining that a number of failed storage devices exceeds a number of redundancies in a storage configuration of the storage system; changing a status of a failed storage device to permit solely read operations; copying valid data from the failed storage device to a spare storage device; reconstructing invalid data on the failed storage device based on corresponding data from other storage devices; storing the reconstructed data on the spare storage device; and removing the failed storage device from the storage system.

Data storage systems can include various storage devices, such as solid state drives ("SSD") and hard disk drives ("HDD"). Conventionally, a storage system might have included solely HDDs, and when a HDD failed, a significant portion of the stored data would become corrupted. Consequently, the disk would be taken offline. Data from remaining operational HDDs would be used to reconstruct the data on the failed disk, and this data would be stored on a replacement disk. With storage capacity typically on the order of gigabytes (GB), HDDs would require a few hours of time for their data to be reconstructed and transferred to a replacement storage device.

However, such conventional techniques are resource intensive and cumbersome when applied to more advanced storage. For example, SDDs can store data on the order of terabytes (TB), and reconstruction of data on a single SDD could require several days. Additional storage devices could fail before the initial failed device is reconstructed and replaced, thereby rendering the storage system incapable of servicing I/O requests. Moreover, in storage systems with high redundancy (e.g., 8+1 RAID, 16+1 RAID), reconstruction incurs a high number of read operations. Furthermore, SDDs include multiple dies, any one of which may fail independently of the others. Unlike HDDs, whose failure typically renders many tracks, and possibly the entire storage device, inoperable, an SDD may still store significant amounts of valid data, even if some of the dies fail. Furthermore, failures on multiple SDDs may impact different data; even if one storage device has failed dies, remaining valid data may be used to reconstruct data that has failed on other devices.

Instead of taking an entire storage device offline, techniques described herein permit valid data on the device to continue being read in tandem with the preparation of a replacement device. The valid data is copied to a spare storage device. For the failed data, the data is reconstructed from the remaining operational storage devices and stored on the spare storage. While these steps are occurring, the storage device still permits read accesses to valid data, thereby continuing to service read requests. Moreover, should another device fail, so long as the failures do not impact the same data on the failed devices, a failed device may nevertheless provide data for reconstruction purposes. After the spare device has been populated with the valid data from the failed device and the data reconstructed from the remaining operational storage devices, the failed device is taken offline and the spare device added to the storage system.

The techniques described herein manage failed devices to reduce the resources required to prepare replacements and the likelihood of disruptions to the storage system. In at least some implementations in accordance with the techniques as described herein, one or more of the following advantages can be provided: shorter latency for replacing a failed storage device, reductions in I/O requests, processor time, and memory needed to prepare a replacement device, more continuous access to the storage system, and increased resiliency to failures on storage devices.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the hosts 14a-14n and management system 16 may be any one of a variety of proprietary or commercially available single or multi-processor system, or other type of commercially available processor able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. It is noted that the terms "storage device(s)" and "drive(s)" are employed herein interchangeably. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally use in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files of a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114A.

FIG. 2 is a block diagram depicting a set of dies 205a, 205b, . . . , 205n (individually and collectively, "205") on an exemplary storage device 17 in the computer system 10 of FIG. 1. The dies 205 on a storage device 17 may be uniformly sized so as to contain the same storage capacity. Any given die 205 may fail, independently of the other dies 205, thereby rendering the data on the die 205 inaccessible and/or unreliable. As data on other dies 205 may be unaffected by the failure of a separate die 205, the data on those dies 205 may still be valid and readable. In some embodiments, each storage device 17 in the computer system 10 may include the same number of dies 205, and in other embodiments, the number of dies 205 may vary from one storage device 17 to another. In some embodiments, the storage device 17 may be a solid state device ("SSD").

FIG. 3 is a block diagram depicting logical block addresses ("LBA") 305a, 305b, . . . , 305n (individually and collectively, "305") spanned by one exemplary die 205 on a storage device 17 in the computer system 10 of FIG. 1. In some embodiments, when the die 205 fails, the data on all of its LBAs 305 is deemed unreliable. In other embodiments, individual LBAs 305 on the die 205 may fail; data on these failed LBAs 305 may be reconstructed from corresponding LBAs 305 on the other devices 17 and stored on a spare device 17, whereas data on non-failed LBAs 305 may be copied to the spare device 17. In further embodiments, should an individual LBA 305 or a threshold number of LBAs 305 fail, then the entire die 205 is considered to have failed. All of the LBAs 305a-305n are treated as if they have failed, even if some remain operational and still store valid data.

FIG. 4 is a table 400 illustrating an example of the techniques described herein, as applied to a 4+1 RAID storage system with two spare devices 17f, 17g. In this example, five storage device D1-D5 (17a-17e) store copies of the same data on dies 205a-205d. Die 205a fails on device D1 (17a), but does not fail on devices D2-D5 (17b-17e). Die 205c fails on device D2 (17b), but does not fail on devices D1 and D3-D5 (17*a*, 17*c-e*). Data on all of the other dies 305*a*-305*d* on the devices D1-D5 (17*a*-17*e*) remain intact.

The number of failed storage devices (2) is compared to the number of redundancies in the 4+1 RAID system. In this situation, the former exceeds the latter. Consequently, the status of device D1 (17*a*) is changed to prevent data from being written to the device 17*a*, although data may still be read from the non-failed dies 205*b*-205*d*. In some embodiments, this status is known as "probation". Because die 205*a* has failed, the data in this die 205*a* is reconstructed from the corresponding dies 205*a'*, 205*a"*, 205*a'''*, 205*a''''* on devices D2-D5 (17*b*-17*e*) and stored in the die 205*a'''''* on the first spare device (17*f*). Moreover, because dies 205*b*-205*d* on device D1 (17*a*) are still valid and reliable, data is copied from device D1 (17*a*) to the corresponding dies 205*b'''''*-205*d'''''* on the first spare device (17*f*). After the first spare device (17*f*) has been populated with the reconstructed data and the data from device D1 (17*a*), the first spare device (17*f*) is added to the storage system as an active storage device 17, and the status of device D1 (17*a*) is changed to take the device D1 (17*a*) offline.

Similarly, the status of device D2 (17*b*) is changed to prevent data from being written to the device D2 (17*b*), although data may still be read from the non-failed dies 205*a'*, 205*b'*, and 205*d'*. Because die 205*c'* has failed, the data in this die 205*c'* is reconstructed from the corresponding dies 205*c*, 205*c"*, 205*c'''*, 205*c''''* on devices D1 and D3-D5 (17*a*, 17*c*-17*e*) and stored in the die 205*c'''''* on the second spare device (17*g*). Moreover, because dies 205*a'*, 205*b'*, and 205*d'* on device D2 (17*b*) are still valid and reliable, data is copied from device D2 (17*b*) to the corresponding dies 205*a'''''*, 205*b'''''*, and 205*d'''''* on the second spare device (17*g*). After the second spare device (17*g*) has been populated with the reconstructed data and the data from device D2 (17*b*), the second spare device (17*g*) becomes active, the status of device D2 (17*b*) is changed to take the device D2 (17*b*).

In this manner, even though D1 (17*a*) and D2 (17*b*) experience failures, their valid data remains readable so as to service read requests while the replacement devices 17*f*, 17*g* are being prepared. Moreover, their valid data remains readable so as to assist reconstruction of data that has failed on other devices. Furthermore, because valid data is copied from a storage device 17 with a failed die 205 instead of being reconstructed from the remaining storage devices 17, numerous read requests to the storage devices 17 can be avoided.

In the example illustrated through FIG. 4, individual dies 205 fail and thereby render data stored on all of the logical block addresses (LBAs) 305 associated with the die 205 invalid. Thus, reconstruction of data on a die 205 applies to all of the corresponding LBAs 305, even if some of the data remains valid. In other embodiments, individual LBAs 305 may be identified as failing, such that data from some LBAs 305 on a die 205 are reconstructed from their counterparts on other storage devices 17 while remaining, operational LBAs 305 on the same die 205 are copied to the spare storage device 17.

Figure 5A:
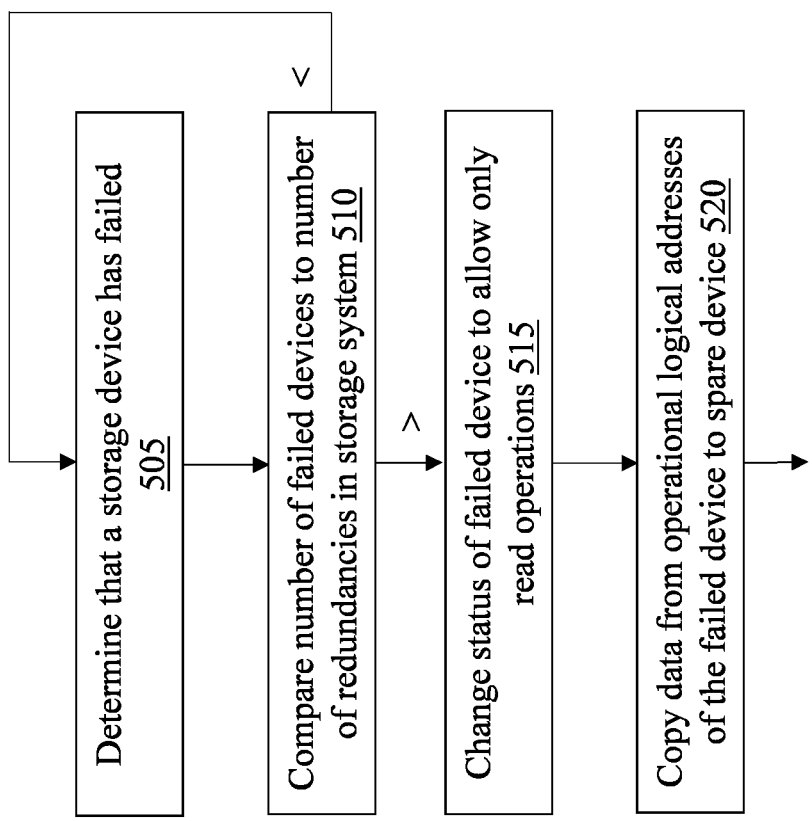
FIGS. 5A and 5B are a flow diagram depicting an exemplary technique for managing failed storage devices.
Figure 5B:
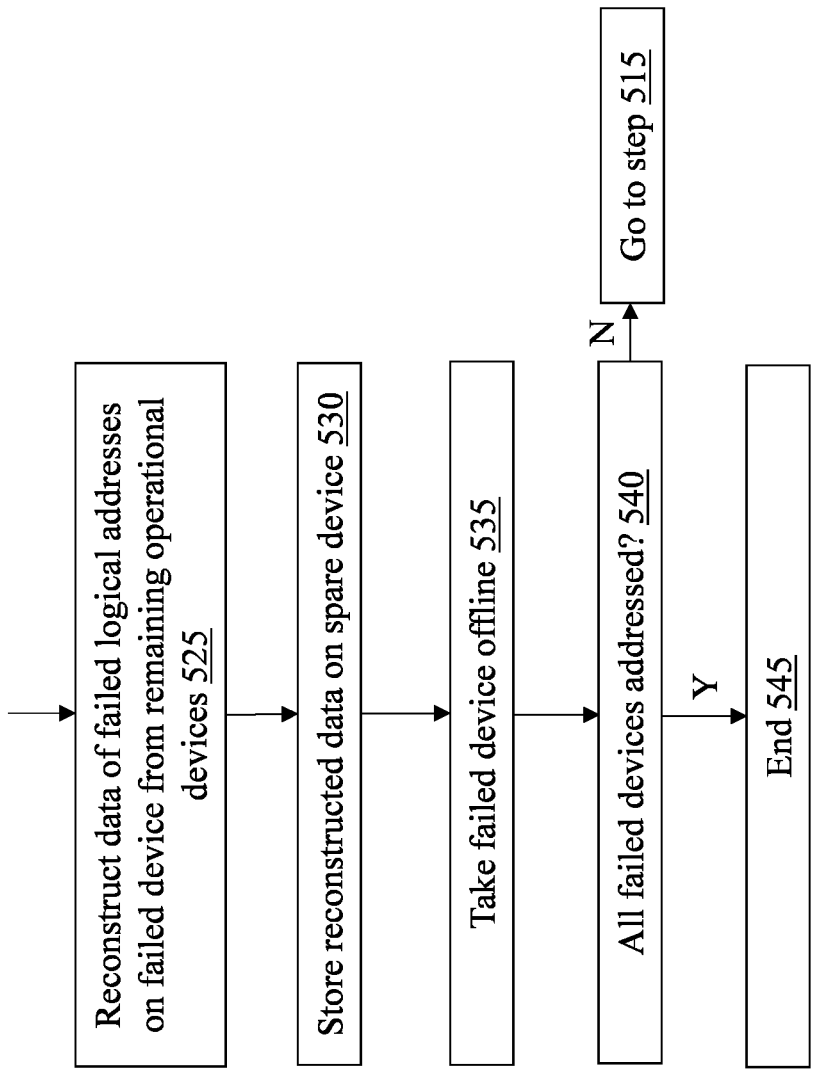

FIG. 5A-5B is a flow diagram depicting an exemplary technique for managing failed storage devices. A storage device is determined to have failed (step 505). The number of failed storage devices is compared to the number of redundancies in the storage system (step 510). If the redundancies exceed the number of failed storage devices, then the technique waits until the next storage device fails. However, if the redundancies exceed the number of failed storage devices, the status of a failed device is changed to allow only read operations (step 515). Data stored on operational logical addresses of the failed device are copied to a spare device (step 520). Data stored on failed logical addresses of the failed device are reconstructed from the remaining devices (step 525) and stored on the spare device (step 530).

After the spare device is populated with reconstructed data and valid data from the failed device, the failed device is taken offline (step 535). If all of the failed storage devices have been addressed (step 540), then there are no more failed storage devices to manage. However, if at least one failed device has not been addressed, the steps beginning with step 515 are repeated for one of the remaining failed storage devices.

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing failed storage devices in a storage system, the method comprising:
    determining that a number of failed storage devices exceeds a number of redundancies in a storage configuration of the storage system;
    changing a status of a failed storage device to permit solely read operations;
    copying valid data from the failed storage device to a spare storage device;
    reconstructing invalid data on the failed storage device based on corresponding data from other storage devices;
    storing the reconstructed data on the spare storage device; and
    removing the failed storage device from the storage system.

2. The method of claim 1, further comprising:
    replacing the failed storage device in the storage system with the spare storage device.

3. The method of claim 1, wherein determining that the number of failed storage devices exceeds the number of redundancies comprises:
    comparing the number of failed storage devices to the number of redundancies in the storage configuration.

4. The method of claim 1, wherein changing the status of the failed storage device comprises:
    changing the status so as to permit read operations solely from logical addresses storing valid data.

5. The method of claim 1, wherein copying the valid data from the failed storage device to the spare storage device comprises:
    copying data from logical addresses storing valid data to the spare storage device.

6. The method of claim 1, wherein reconstructing the invalid data on the failed storage device based on corresponding data from other storage devices comprises:
    determining that the corresponding data stored on the other storage devices is valid.

7. The method of claim 6, wherein determining that the corresponding data stored on the other storage devices is valid comprises:
    determining, for each of the other storage devices, a status of the storage device regarding the validity of its stored data.

8. The method of claim 7, wherein determining, for each of the other storage devices, the status of the storage device regarding the validity of its stored data comprises:
    determining, for one of the other storage devices, that at least some of the data stored on the other storage device is invalid.

9. The method of claim 8, wherein determining, for each of the other storage devices, the status of the storage device regarding the validity of its stored data further comprises:
    determining, for the one of the other storage devices, that data corresponding to invalid data on the failed storage device remains valid on the one of the other storage devices.

10. The method of claim 6, wherein reconstructing the invalid data on the failed storage device based on the corresponding data from the other storage devices comprises:
    reading, from each of the other storage devices, data corresponding to the data that is invalid on the failed storage device; and
    using the read data to reconstruct the data.

11. A system for managing failed storage devices in a storage system, the system including a processor configured to:
    determine that a number of failed storage devices exceeds a number of redundancies in a storage configuration of the storage system;
    change a status of a failed storage device to permit solely read operations;
    copy valid data from the failed storage device to a spare storage device;
    reconstruct invalid data on the failed storage device based on corresponding data from other storage devices;
    store the reconstructed data on the spare storage device; and
    remove the failed storage device from the storage system.

12. The system of claim 11, wherein the processor is further configured to:
    replace the failed storage device in the storage system with the spare storage device.

13. The system of claim 11, wherein the processor is further configured to:
    compare the number of failed storage devices to the number of redundancies in the storage configuration.

14. The system of claim 11, wherein the processor is further configured to:
    change the status so as to permit read operations solely from logical addresses storing valid data.

15. The system of claim 11, wherein the processor is further configured to:
    copy data from logical addresses storing valid data to the spare storage device.

16. The system of claim 11, wherein the processor is further configured to:
    determine that the corresponding data stored on the other storage devices is valid.

17. The system of claim 16, wherein the processor is further configured to:
    determine, for each of the other storage devices, a status of the storage device regarding the validity of its stored data.

18. The system of claim 17, wherein the processor is further configured to:
    determine, for one of the other storage devices, that at least some of the data stored on the other storage device is invalid.

19. The system of claim 18, wherein the processor is further configured to:
    determining, for the one of the other storage devices, that data corresponding to invalid data on the failed storage device remains valid on the one of the other storage devices.

20. The system of claim 16, wherein the processor is further configured to:

reading, from each of the other storage devices, data corresponding to the data that is invalid on the failed storage device; and using the read data to reconstruct the data.

* * * * *